INVENTOR.
S. M. MARTIN
BY A.C. Schwarz, Jr.
ATTORNEY

United States Patent Office 2,932,412
Patented Apr. 12, 1960

2,932,412

APPARATUS FOR UNLOADING AN ARTICLE FROM A TURNTABLE

Samuel M. Martin, Lutherville, Md., assignor to Western Electric Company, Incorporated, New York, N.Y., a corporation of New York Application July 15, 1958, Serial No. 748,745

6 Claims. (Cl. 214—1)

The present invention relates to apparatus for unloading an article from a turntable, and relates more particularly to apparatus for unloading a barrel from a turntable quickly and easily in order to allow continuous operation of a process utilizing a succession of barrels.

An object, therefore, of the invention is to provide apparatus for unloading an article from a turntable.

Another object of the invention is to provide apparatus for unloading a barrel from a turntable quickly and easily in order to allow continuous operation of a process utilizing a succession of barrels.

An apparatus for unloading an article from a turntable, illustrating certain features of the invention, may include means for rotating the turntable and a plurality of rollers mounted in two lines and normally positioned below the turntable so as not to interfere with the rotation thereof. The turntable is so shaped with respect to the article that portions of the article overhang the turntable. Means are provided for stopping the rotation of the turntable in a position where the overhanging portions of the article are above the rollers, the rollers being so constructed and arranged as to be clear of the turntable edges at this time. Means are provided for causing relative vertical movement of the rollers and the turntable to lift the article off of the turntable in order to facilitate unloading of the article.

The article may conveniently be a barrel, in which case the turntable is preferably generally circular in shape, but is provided with two parallel, trimmed-off, straight edges on opposite sides thereof over which portions of the barrel overhang. Means are provided for stopping the turntable in a positively oriented position where the straight edges are parallel to the mounting lines of the rollers, which are clear of the turntable edges at this time. The rollers are preferably elevated to lift the barrel off of the turntable and tilted in order to facilitate unloading.

Other objects and advantages of the invention will appear from the following detailed description of a specific embodiment thereof, when read in conjunction with the appended drawings, in which.

Figure 1:
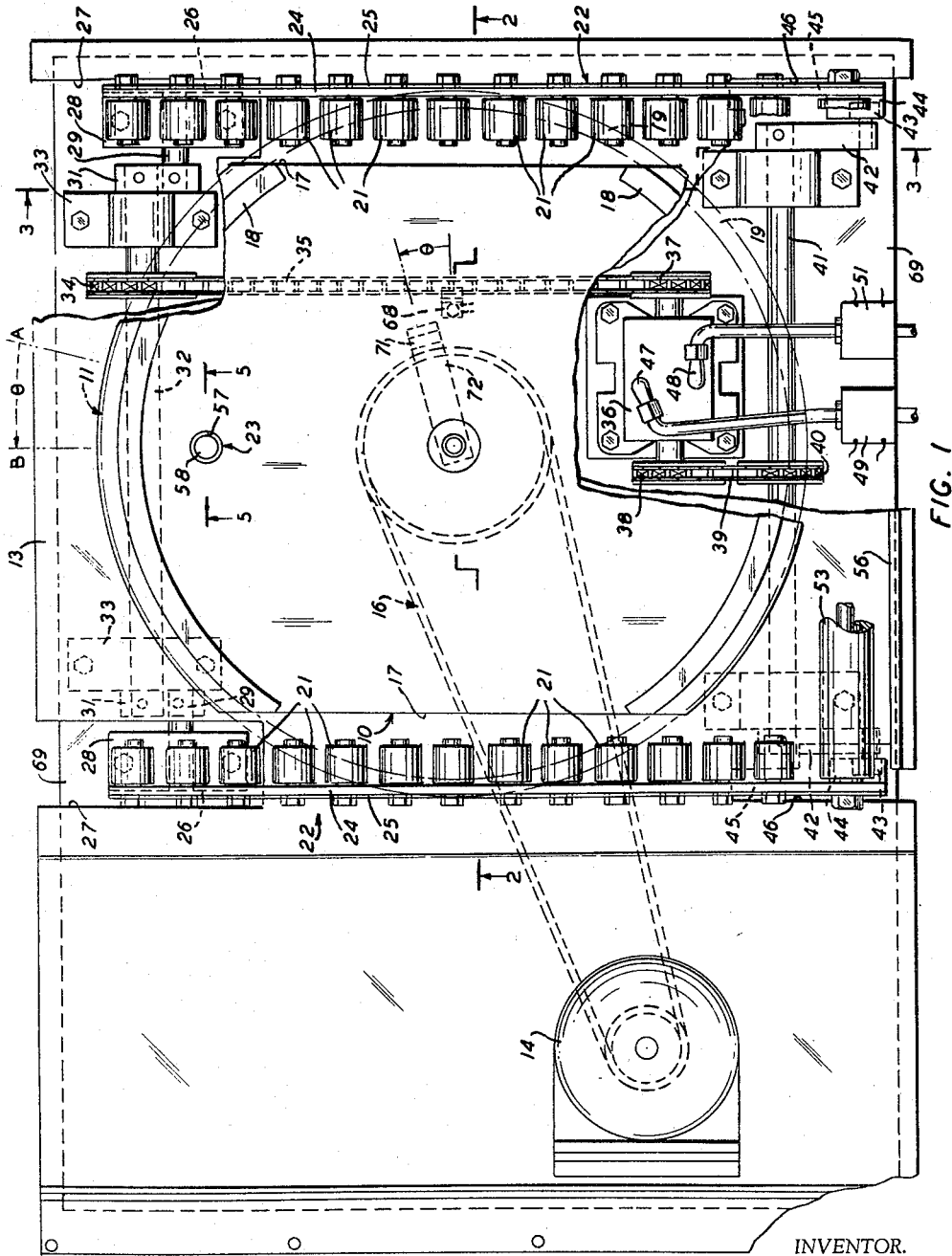
Fig. 1 is a top plan view of an apparatus embodying the invention, with portions broken away to reveal structural details.
Figure 2:
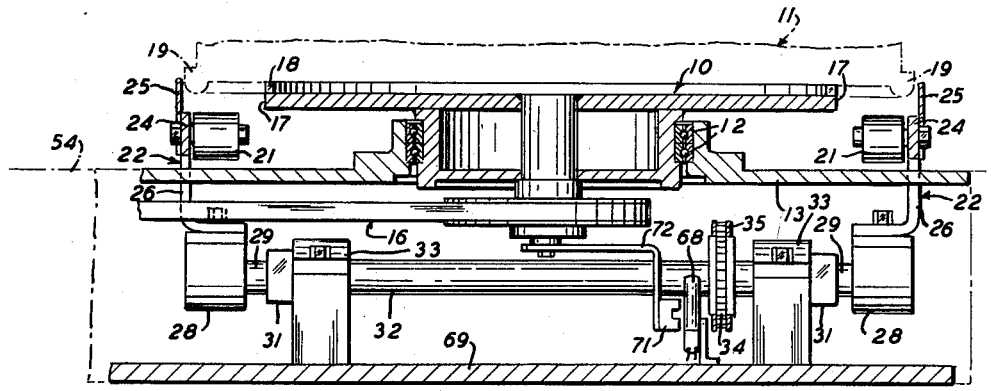
Fig. 2 is a vertical section taken generally along the line 2—2 of Fig. 1 in the direction of the arrows.

Referring now in detail to the drawings, and in particular to Figs. 1 and 2, the apparatus includes a turntable, designated generally by the numeral 10, upon which an object, such as a barrel, designated generally by the numeral 11 and having portions thereof shown in phantom lines, may be placed for rotation therewith. The rotatable barrel 11 may be used for diverse purposes, particularly in a continuous process utilizing a succession of barrels such as in collecting a strand according to the principles of my copending application Serial No. 741,324, filed on June 11, 1958, and entitled "Apparatus for Distributing a Strand Into a Rotatable Open-Topped Receiver."

The barrel 11, illustrated herein, is generally similar to that disclosed in my above-mentioned copending application and is designed to collect a flexible strand, such as an insulated conductor, in the form of a continuous succession of loops. A deflector, for example, one having a spiral cross section, is mounted above the barrel and is designed to receive an advancing strand and cause the same to fall along a descending helical path into the rotating barrel 11 for collection therein as loops. The turntable 10 is mounted in bearings 12—12 (Fig. 2) for rotation with respect to a recessed supporting platform 13 and may be rotated by a variable-speed motor 14 (Fig. 1) through the intermission of a belt-and-pulley transmission, designated generally by the numeral 16.

The present invention contemplates apparatus for unloading the barrel 11 from the turntable 10 when the barrel is filled with the strand and it is desired to substitute an empty barrel therefor. It is desirable that the changeover be accomplished with a minimum of manual effort and as rapidly as possible, so as to allow continuous operation of the strand-collection apparatus. As best seen in Fig. 1, the turntable 10 is generally circular, but is provided with two parallel, trimmed-off, straight edges 17—17 on opposite sides thereof, over which portions of the barrel 11 overhang, as illustrated in Figs. 1 and 2.

Each of the circular portions of the turntable 10, at the top and bottom of Fig. 1, is provided with an upstanding arcuate rib 18 designed to center the barrel 11 with respect to the turntable 10 and retain the barrel thereon during rotation thereof. The barrel 11 is originally positioned so that a depending annular flange 19 is seated on the annular surface of the turntable 11 between the outer periphery of the ribs 18—18 and the outer edge of the turntable. Each of the curved portions of the turntable surface preferably extend over an arc of about 52° and the straight edges over complementary arcs of about 38°.

A plurality of short idler rollers 21—21 are provided, mounted for rotation about their own axes in two parallel lines on opposite sides of the turntable 10 and normally positioned below the lower surface of the turntable 10 (Fig. 2) so as not to interfere with the rotation thereof. For this purpose, the rollers 21—21 are carried by a pair of supporting frames, designated generally by the numerals 22—22 and located on opposite sides of the turntable 10, as illustrated in Figs. 1 and 2.

When it is desired to unload the barrel 10 from the turntable 11, the motor 14 is de-energized and the turntable 10 is stopped in a positively oriented position, illustrated in Fig. 1, by means designated generally by the numeral 23 and to be described in detail hereinafter with particular reference to Fig. 5. The end position of the turntable 10 is so oriented that the straight edges 17—17 are parallel to the supporting frames 22—22 and thus to the mounting lines of the rollers 21—21. The rollers 21—21 are so constructed and arranged (having reference to their sizes and the position of the frames 22—22) as to be clear of the turntable edges 17—17 at this time, as seen in Fig. 2.

Figure 3:
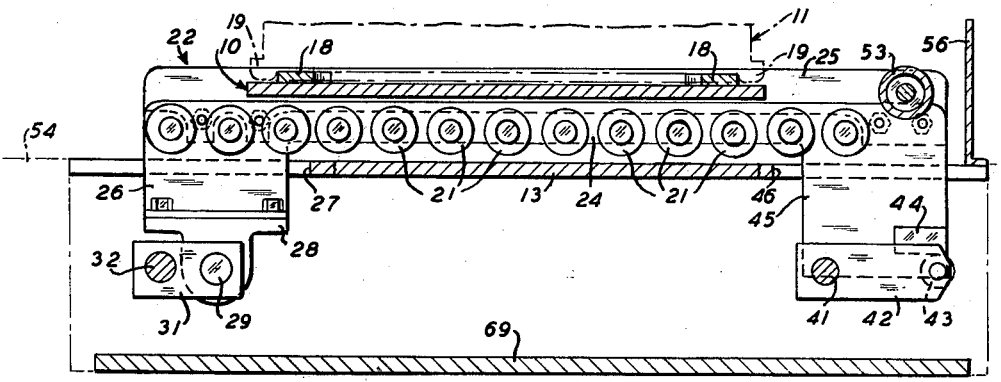
Fig. 3 is a vertical section taken generally along the line 3—3 of Fig. 1 in the direction of the arrows, and illustrating certain elements in barrel-rotating positions.
Figure 4:
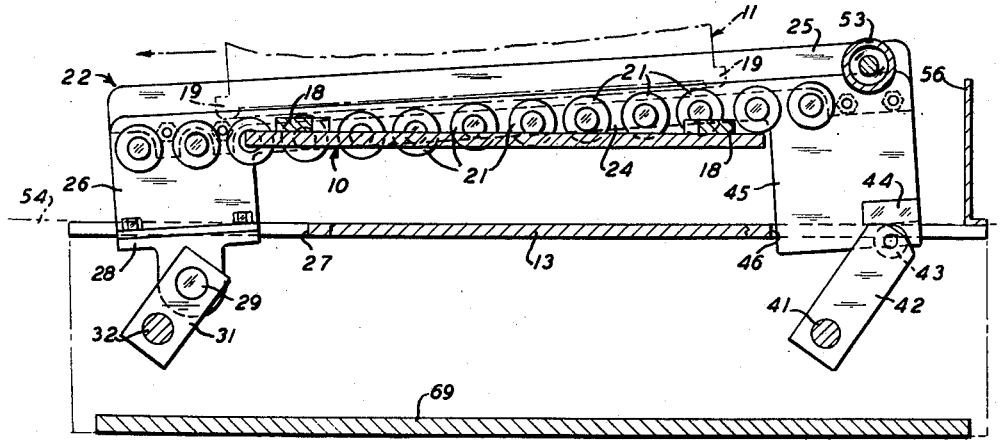
Fig. 4 is a view similar to Fig. 3, but illustrating certain elements moved to barrel-unloading positions.

After the turntable 10 is properly oriented, the rollers 21—21 are elevated to lift the barrel 11 off of the turntable 10 and are preferably tilted to facilitate the unloading thereof. The lifting and tilting mechanism is best seen in Figs. 1, 3 and 4, Fig. 3 illustrating the normal, barrel-rotating position and Fig. 4 showing certain elements moved to their barrel-unloading positions. The construction of the two supporting frames 22—22, illustrated in Fig. 1, is substantially the same as is the construction of the elevating and tilting means for each; therefore, the design of these elements will be discussed in detail only with respect to the frame 22, shown at the right of Fig. 1, as illustrated in Figs. 3 and 4, it being understood that the other frame 22, shown at the left of Fig. 1, is provided with similar elements.

The frame 22 is shown in its barrel-rotating position in Fig. 3, after orienting and previous to unloading of the barrel 11. A portion of the turntable 10 and the barrel 11 are shown in order that the relative position of the frame 22 and the rollers 21—21 may be appreciated. The rollers 21—21 are carried by a central portion 24 of the frame 22 (which extends over the entire width of the frame 22 and to which all of the rollers 21—21 are mounted) in a horizontal line just below the under surface of the turntable 10. A pair of upstanding flanges 25—25 are bolted to the outside of the central portions 24—24 of the frames 22—22, as illustrated in Fig. 2, so as to be just clear of the barrel flange 19 to assist in the unloading operation by retaining the barrel 11 on the rollers 21—21.

A depending flange 26 is formed integrally with the central portion 24 and depends from the left end thereof, as viewed in Figs. 3 and 4, through a cut-out portion 27 of the platform 13. The lower portion of the flange 26 is curved, as seen in Fig. 2, and is bolted to a bearing member 28, within which is journalled a crank pin 29. The crank pin 29 is keyed to the right side (Fig. 3) of a crank 31 and a rocker shaft 32 is keyed to the left side thereof. As seen in Figs. 1 and 2, the rocker shaft 32 extends over most of the length of the apparatus, between the crank 31 just described and a similar crank 31 at the left of those figures, and is journalled between a pair of bearing members 33—33.

As best seen in Fig. 1, the rocker shaft 32 is formed with a sprocket 34, which may be driven through a chain 35 from a rotary air motor 36 having a sprocket 37 formed about one output shaft and in mesh with the chain 35. A sprocket 38 is formed about a second output shaft of the air motor 36 and meshes with a second chain 39 to drive a sprocket 40 of a second rocker shaft 41 (at the right side of Figs. 3 and 4) in a similar fashion.

A pair of cranks 42—42 are keyed to the opposite ends of the rocker shaft 41 for rotation therewith, the crank 42 at the right of Fig. 1 being seen at the right of Figs. 3 and 4, it being understood that the crank 42 at the left of Fig. 1 is similar in construction and function. The crank 42 is provided with a roller 43 extending therefrom, which bears against the under surface of a block 44 secured to and extending from a second depending flange 45 of the bracket 22, at the right of Figs. 3 and 4. The depending flanges 45—45 extend through cut-out portions 46—46 of the platform 13 similar to the cut-out portions 27—27 accommodating the flanges 26—26.

The air motor 36 is a limited-rotation device of a well-known type, which may be regarded as an oscillating air cylinder having vanes rather than a piston, and is provided with two feed lines 47 and 48 (Fig. 1) for compressed air and two solenoid valves 49 and 51 for supplying compressed air to the motor 36 through a desired one of the feed lines 47 or 48. Normally, the solenoid valve 49 is energized to supply air through the line 47 and the air motor 36 tends to rotate the rocker shafts 32 and 41 in a clockwise direction as viewed in Figs. 3 and 4. Stops are provided within the air motor to limit the clockwise movement so that the movable elements assume the position illustrated in Fig. 3 with the cranks 31 and 42 in horizontal alignment so that the rollers 21—21 are horizontal and just below the turntable 10. One such air motor is termed a Rotac rotary oscillating torque actuator and is manufactured by the Ex-Cell-O Corporation of Detroit, Michigan.

In order to unload the turntable 10, the solenoid valve 49 is de-energized and the solenoid valve 51 is energized, so as to supply air to the opposite side of the motor 36 to rotate the rocker shafts 32 and 41 in a counterclockwise direction, as viewed in Figs. 3 and 4. The motor 36 rotates in this direction until further stops have been engaged, at which time the shafts 32 and 41 and the cranks 31 and 42 connected thereto have been rotated through a desired angle, for example about 55°, to the unloading positions illustrated in Fig. 4.

As the left-hand crank 31 is rotated, the left-hand flange 26 mounted thereto is elevated and moved to the left, as viewed in Figs. 3 and 4. As the right-hand crank 42 is rotated, the roller 43 bears on portions of the under surface of the block 44 so as to elevate the right-hand flange 45 and move the same to the left. The crank lengths and angle of rotation are designed so that all of the rollers 21—21 are elevated a sufficient distance to lift the barrel 11 off of the turntable 10, as illustrated in Fig. 4, in order to facilitate unloading of the barrel.

In addition, it is preferred that the crank 42 (having regard to the distance between the roller 43 and the rocker shaft 41) be made a predetermined amount longer than the crank 31 (having regard to the distance between the crank pin 29 and the rocker shaft 32), so that the right end of the frame 22 is elevated substantially higher than the left end. With this arrangement, a pronounced tilt is imparted to the two lines of rollers 21—21, as seen in Fig. 4, so that the barrel 11 may be readily discharged therefrom, as by gravity or with only a slight push. The barrel 11 may conveniently be unloaded onto a discharge conveyor (not shown, but assumed to be at the left of the apparatus as viewed in Figs. 3 and 4) as indicated by the arrow in Fig. 4.

An empty barrel may be placed on the elevated rollers 21—21 and the frames 22—22 pivoted back to the position illustrated in Fig. 3 by de-energization of the solenoid valve 51 and energization of the solenoid valve 49. The empty barrel is set on the turntable 10 so that the depending flanges 19—19 thereof rest on the portions of the turntable surface beyond the centering ribs 18—18. A long roller 53 extends between the two supporting frames 22—22 in a line above the short rollers 21—21 and at the extreme right of the frames 22—22, as viewed in Figs. 3 and 4, and facilitates the placing of the empty barrel from the floor level 54, over an upstanding guard flange 56, and onto the short rollers 21—21.

Figure 5:
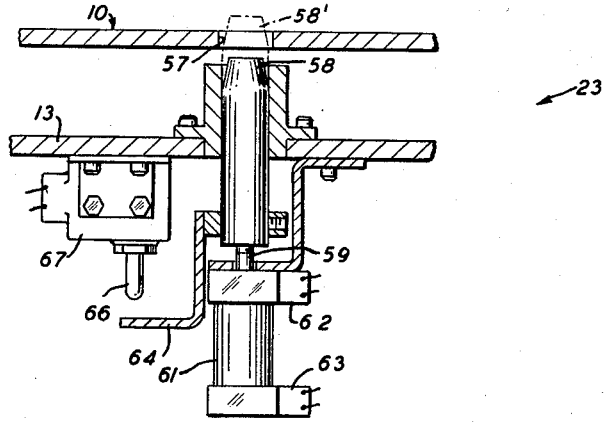
Fig. 5 is an enlarged fragmentary vertical section, taken generally along the line 5—5 of Fig. 1, and illustrating particularly means for stopping and orienting the turntable in predetermined position.

The turntable stopping and orienting means 23, described as to function hereinbefore, is best seen in Figs. 1 and 5. The turntable 10 is formed with an orienting aperture 57, preferably a circular bore therethrough, as shown at the top of Fig. 1. A locating pin 58 having a smaller, but matching configuration is provided and is normally maintained retracted beneath the turntable 10, as illustrated in Fig. 5, so as not to interfere with the rotation thereof. The locating pin 58 is connected to a piston rod 59 of a solenoid-operated air cylinder 61. Normally, compressed air is supplied to the top of the cylinder 61 by a first solenoid valve 62 to maintain the piston rod 59 and thus the locating pin 58 in the retracted position.

When it is desired to stop the turntable 10, the solenoid valve 62 is de-energized and a second solenoid valve 63 is energized to apply compressed air to the bottom of the air cylinder 61, so that the locating pin 58 will tend to move from bottom to top, as viewed in Fig. 5. The loeating pin 58 rides on the under surface of the turntable 10 until the orienting aperture 57 passes thereover, at which time the pin 58 is urged upward into the aperture 57 to the position shown fragmentarily in phantom lines in Fig. 5 and designated by the numeral 58', in order to lock the turntable 10 in the properly oriented position illustrated in Fig. 1, wherein the center of the aperture lies along the line designated by the letter "B."

Figure 6:
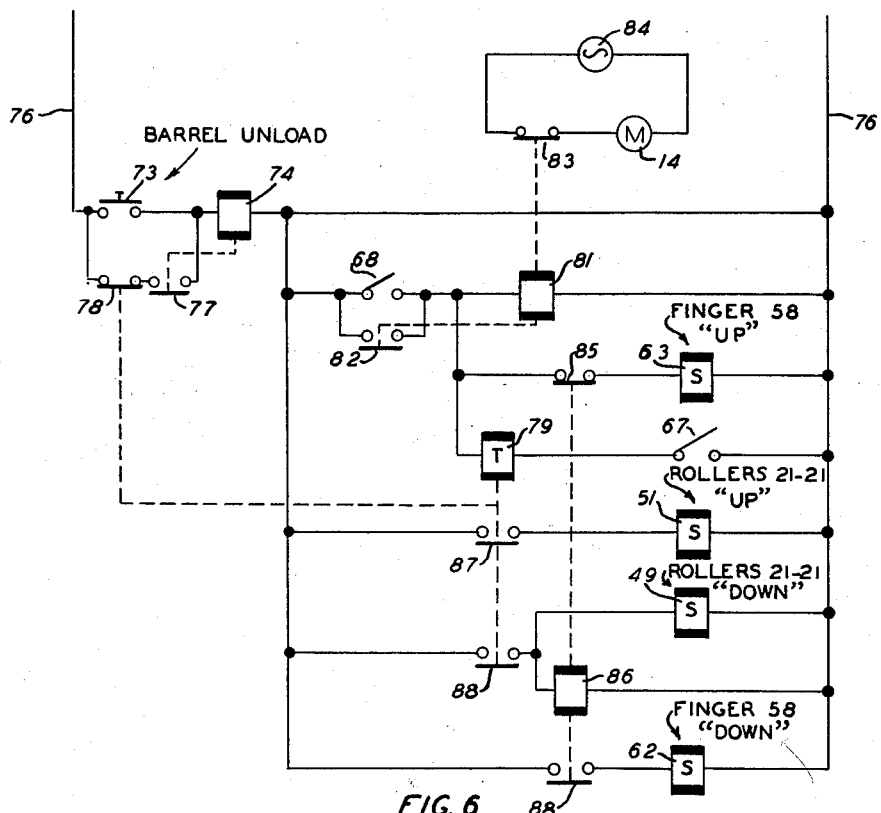
Fig. 6 is a schematic view of a control circuit for operating the apparatus illustrated in Figs. 1 to 5, inclusive, according to the principles of the invention.

When the pin 58 moves upward into the aperture 57, a curved actuating finger 64 carried by the pin 58 depresses a plunger-actuator 66 of a normally open limit switch 67 to close the switch 67, so as to indicate that the turntable 10 has been properly oriented and initiate operation of the solenoid valve 51 to elevate the rollers 21—21, according to the control circuit illustrated in Fig. 6.

It is preferred to de-energize the turntable-drive motor 14 at a time when the orienting aperture 57 is a predetermined distance away from the locating pin 58 each time the barrel is unloaded. The line "A" in Fig. 1 designates the desired position of the aperture 57 when the motor 14 is to be de-energized, assuming that the turntable 10 is rotating in a counterclockwise direction, as indicated by the dotted arrow between the lines "A" and "B." The line "A" is retarded a predetermined drift angle θ behind the line "B" and, for some applications, the angle θ may have a value of about 15°.

In order to achieve the desired drift angle θ, a magnetic switch 68 is mounted in a fixed position on a bottom support 69, as illustrated in Fig. 2, and may be positioned directly to the right of center as illustrated in Fig. 1. A magnet 71 is secured to an arm 72, which is mounted for rotation with the turntable 10 and extends therebelow so that the magnet 71 is in the same plane as the magnetic switch 68, as illustrated in Fig. 2. Each time the magnet 71 passes the switch 68, the switch 68 is momentarily closed; however, closure of the switch 68 is usually meaningless, except when the operator has depressed a barrel-unload push-button switch 73 (Fig. 6) to initiate the barrel-unloading operation.

When the push-button switch 73 has previously been closed, the next passage of the magnet 71 past the magnetic switch 68 operates, through the control circuit illustrated in Fig. 6, to de-energize the motor 14 and initiate the drift portion of the cycle. For this purpose, the arm 72 is positioned so that the magnet 71 actuates the switch 68 at the same time that the orienting aperture 57 crosses the line "A," as illustrated in Fig. 1.

*Control circuit and operation*

Referring now to the control circuit illustrated in Fig. 6, the barrel-unload push-button switch 73 is seen at the top-left of the figure and initiates the entire barrel-unloading cycle. When the push-button switch 73 is momentarily depressed, a first control relay 74 is energized across a pair of supply conductors 76—76. When the relay 74 is energized, a normally open contact 77 thereof is closed to hold the energization circuit for the relay 74 through the now-closed contact 77 and a first, normally closed contact 78 of a timing relay 79. The control circuit is now prepared for operation and nothing further occurs until the magnetic switch 68 is momentarily closed by the passage of the magnet 71 at the point where the aperture 57 is located in alignment with the line "A" in Fig. 1.

As the switch 68 is closed, a second control relay 81 is energized and closes a first, normally open contact 82 thereof to hold the energization circuit therefor around the magnetic switch 68, which reopens as soon as the magnet 71 has passed thereby. The relay 81 also opens a second, normally closed contact 83 thereof in order to de-energize the turntable-rotating motor 14, which had been energized from an appropriate power supply 84.

As a magnetic switch 68 is closed, the solenoid valve 63 (Fig. 5) is energized through a normally closed contact 85 of a third control relay 86. When the solenoid valve 63 is energized, compressed air is applied to the lower end of the air cylinder 61 to urge the piston rod 59 and the locating finger 58 upward, as viewed in Fig. 5. The locating finger 58 rides on the under surface of the turntable 10 until the barrel has rotated through the angle θ and the orienting aperture 57 is in vertical alignment with the finger 58. Then, the locating finger 58 is moved upward to the phantom line position 58' wherein the orienting aperture 57 is impaled and the turntable 10 is positively locked in the position illustrated in Fig. 1. When this occurs, the actuating finger 64 depresses the plunger-actuator 66 to close the limit switch 67 in order to initiate the unloading operation.

As illustrated in Fig. 6, closure of the switch 67 results in the energization of the timing relay 79, which controls the remainder of the operation. Immediately upon energization thereof, the timing relay 79 closes a second contact 87 thereof (the first contact 78 previously mentioned remaining closed until the end of the operation) in order to energize the solenoid valve 51 to elevate the rollers 21—21. When the valve 51 is energized, compressed air is applied to the air motor 36 (Fig. 1) through the supply line 48 in order to rotate the rocker shafts 32 and 41 (Figs. 3 and 4) in a counterclockwise direction to elevate and tilt the rollers 21—21, as described hereinbefore, so as to lift the barrel 11 off of the turntable 10 and tilt the barrel 11 to facilitate unloading thereof.

While the barrel lift is in the upper position, the operator inserts an empty barrel from the floor level 54, over the guard flange 56, onto the long guide roller 53, and then onto the inclined rollers 21—21. The finished barrel is discharged onto the discharge conveyor (assumed to be off the page to the left of Fig. 4) either by gravity or by a slight push applied by the empty barrel.

After a predetermined time interval, which may conveniently be set at about 15 seconds, the timing relay 79 reopens the second contact 87 and closes a third contact 88 thereof. Opening of the contact 87 de-energizes the solenoid valve 51 and closure of the contact 88 energizes the solenoid valve 49, which operates to lower the rollers 21—21 back to their normal positions illustrated in Fig. 3. When the solenoid valve 49 is energized, compressed air is applied to the air motor 36 through the alternative feed line 47 so as to rotate the rocker shafts 32 and 41 in the clockwise direction, as viewed in Figs. 3 and 4, which is effective to lower the empty barrel onto the turntable 10. After the rollers 21—21 have been lowered, the operator positions the empty barrel so that the depending flange 19 is centered between the guide rods 18—18 and the outside edges of the turntable 10, substantially as illustrated in Figs. 1 and 2.

The closure of the third contact 88 of the timing relay 79 also energizes the third control relay 86, which opens the first, normally closed contact 85 thereof in order to de-energize the solenoid valve 63 and closes a second, normally open contact 89 thereof in order ot energize the solenoid valve 62. Energization of the solenoid valve 62 operates to apply compressed air to the top of the air cylinder 61 to retract the piston rod 59 and the locating finger 58 back to their normal positions as viewed in Fig. 5.

The apparatus is maintained in this position, completely stopped, for a second predetermined time interval, which may conveniently be about 10 seconds, in order to insure that the operator has the empty barrel properly located on the turntable 10. Then the first, normally closed contact 78 of the timing relay 79 is opened in order to break the holding circuit for the first control relay 74 so as to return the various components of the control circuit back to their original positions. As the second control relay 81 is de-energized (by the opening of the contact 78), the second, normally closed contact 83 thereof is reclosed in order to reconnect the turntable-driving motor 14 to the power source 84. The motor 14 then rotates the turntable 10 and the empty barrel mounted thereon to begin a new cycle of operation.

It should be noted that the apparatus described herein allows the turntable to be unloaded quickly and easily and enables continuous operation of a process utilizing a succession of barrels, such as the strand-collection apparatus described in my copending application. When the apparatus of this invention is used in combination with the apparatus of my copending application, a straight length of the strand being collected extends between the tops of the full barrel and the empty barrel. The full barrel is allowed to rest on the discharge conveyor until the strand extending therebetween has been cut, and then the discharge conveyor is operated to convey the full barrel to a subsequent strand-working operation, wherein the strand collected therein is used as a supply.

It will be manifest that this invention is not limited to the specific details described in connection with the above embodiment of the invention, but that various modifications may be made without departing from the spirit and scope thereof.

What is claimed is:

1. Apparatus for unloading an article from a turntable, which comprises means for rotating the turntable, a plurality of rollers mounted in two lines and normally positioned below the turntable so as not to interfere with the rotation thereof, the turntable being so shaped with respect to the article that portions of the article overhang the turntable, means for stopping the turntable in a positively oriented position where the overhanging portions of the article are above said rollers, said rollers being so constructed and arranged as to be clear of the turntable edges at this time, and means operated by said stopping means after the turntable has been stopped and oriented for elevating adjacent first ends of said lines of said rollers through a first predetermined distance, and means simultaneously operated by said stopping means for elevating the opposite ends of said lines of said rollers through a second predetermined distance to lift the article off of the turntable and to impart a tilt to the two lines of rollers in order to facilitate unloading of the article from the turnable.

2. Apparatus for unloading a barrel from a turntable, which comprises means for rotating the turntable, a plurality of rollers mounted in two parallel lines and normally positioned below the turntable so as not to interfere with the rotation thereof, the turntable being generally circular but provided with two parallel, trimmed-off, straight edges on opposite sides thereof over which portions of the barrel overhang, means for stopping the turntable in a positively oriented position where the straight edges thereof are parallel to the mounting lines of said rollers, said rollers being so constructed and arranged as to be clear of the turntable edges at this time, means for elevating adjacent first ends of said lines of rollers through a first predetermined distance, and means operated by said stopping means for elevating the opposite ends of said lines through a second predetermined distance, said rollers to lift the barrel off of the turntable and to impart a tilt to the two lines of rollers in order to facilitate unloading of the barrel from the turntable.

3. Apparatus for unloading a barrel from a turntable, which comprises means for rotating the turntable, a pair of supporting frames mounted parallel to each other and on opposite sides of the turntable, a plurality of short rollers mounted at intervals along the length of said frames forming two parallel lines and extending toward the turntable from said frames, said frames being normally positioned so that the tops of said rollers are below the under surface of the turntable so as not to interfere with the rotation thereof, the turntable being generally circular but provided with two parallel, trimmed-off, straight edges on opposite sides thereof over which portions of the barrel overhang, means for stopping the rotation of the turntable in a positively oriented position where the straight edges thereof are parallel to said frames, said frames being so positioned that when the turntable is oriented the overhanging portions of the barrel are directly above certain of said rollers and all of said rollers are clear of the turntable edges, means for elevating first ends of said frames through first predetermined distances, and means for elevating the opposite ends of said frames through second predetermined distances greater than the first predetermined distances, the distances being so regulated that said rollers engage the overhanging portions of the bottom of the barrel and lift the barrel off of the turntable and the opposite ends of said frames are elevated substantially higher than the first ends in order to impart a tilt to the two lines of rollers so as to facilitate unloading of the barrel.

4. Apparatus for unloading a barrel from a turntable, which comprises means for rotating the turntable, a pair of supporting frames mounted parallel to each other and on opposite sides of the turntable, a plurality of short rollers mounted at intervals along the length of said frames forming two parallel lines and extending toward the turntable from said frames, said frames being normally positioned so that the tops of said rollers are below the under surface of the turntable so as not to interfere with the rotation thereof, the turntable being generally circular but provided with two parallel, trimmed-off, straight edges on opposite sides thereof over which portions of the barrel overhang, means for stopping the rotation of the turntable in a positively oriented position where the straight edges thereof are parallel to said frames, said frames being so positioned that when the turntable is oriented the overhanging portions of the barrel are directly above certain of said rollers and all of said rollers are clear of the turntable edges, a first rocker shaft, a first pair of cranks secured to said first rocker shaft, a pair of crank pins secured to said first cranks at first predetermined distances from said first rocker shaft and mounted to first ends of said frames, a second rocker shaft, a second pair of cranks secured to said second rocker shaft, a pair of camming members secured to said second cranks at second predetermined distances from said second rocker shaft longer than the first predetermined distances, a pair of cam-following blocks secured to the opposite ends of said frames and supported by said camming members, and means for rotating said rocker shafts through predetermined angles after the turntable has been oriented in order to elevate said frames so that the barrel is lifted off of the turntable by said rollers and tilt said frames to facilitate unloading of the barrel.

5. Apparatus for rotating a barrel and for unloading the barrel from the apparatus, which comprises: a rotatable turntable on which the barrel may be placed for rotation therewith, the turntable being generally circular but provided with two parallel, trimmed-off, straight edges on opposite sides thereof over which portions of the barrel overhang, the turntable also being formed with an orienting aperture; means for rotating the turntable; a pair of supporting frames mounted parallel to each other and on opposite sides of the turntable; a plurality of short rollers mounted at intervals along the length of said frames, forming two parallel lines, and extending toward the turntable from said frames, said frames being normally positioned so that the tops of said rollers are below the under surface of the turntable so as not to interfere with the rotation thereof; a locating pin designed for reception within the orienting aperture and normally retracted below the turntable so as not to interfere with the rotation thereof; means for disengaging the turntable-rotating means when it is desired to unload the barrel;

means for urging said locating pin upward until said locating pin is forced into the orienting aperture to stop the rotation of the barrel, said locating pin and orienting aperture being so located with respect to each other that the turntable is stopped in a positively oriented position where the straight edges of the turntable are parallel to said frames, said frames being so positioned that when the turntable is oriented the overhanging portions of the barrel are directly above certain of said rollers and all of said rollers are clear of the turntable edges; a first rocker shaft; a first pair of cranks secured to said first rocker shaft; a pair of crank pins secured to said first cranks at first predetermined distances from said first rocker shaft and mounted to first ends of said frames; a second rocker shaft; a second pair of cranks secured to said second rocker shaft; a pair of camming members secured to said second cranks at second predetermined distances from said second rocker shaft longer than the first predetermined distances; a pair of cam-following blocks secured to the opposite ends of said frames and supported by said camming members; means for rotating said rocker shafts through predetermined angles so that said frames are elevated to lift the barrel off of the turntable and tilted to facilitate unloading of the barrel; and means responsive to the mutual engagement of said locating pin and the orienting aperture for initiating the operation of said rocker-shaft rotating means.

6. Apparatus for rotating a barrel and for unloading the barrel from the apparatus, which comprises: a rotatable turntable on which the barrel may be placed for rotation therewith, the turntable being generally circular but provided with two parallel, trimmed-off, straight edges on opposite sides thereof over which portions of the barrel overhang, the turntable also being formed with an orienting aperture; means for rotating the turntable; a pair of supporting frames mounted parallel to each other and on opposite sides of the turntable; a plurality of short rollers mounted at intervals along the length of said frames, forming two parallel lines, and extending toward the turntable from said frames, said frames being normally positioned so that the tops of said rollers are below the under surface of the turntable so as not to interfere with the rotation thereof; a locating pin designed for reception within the orienting aperture and normally retracted below the turntable so as not to interfere with the rotation thereof; a stopping switch designed for operation when it is desired to unload the barrel; switching means for disengaging the turntable-rotating means at a time after operation of said stopping switch when the orienting aperture is a predetermined distance from said locating pin; means for urging said locating pin upward until said locating pin is forced into the orienting aperture to stop the rotation of the barrel, said locating pin and orienting aperture being so located with respect to each other that the turntable is stopped in a positively oriented position where the straight edges of the turntable are parallel to said frames, said frames being so positioned that when the turntable is oriented the overhanging portions of the barrel are directly above certain of said rollers and all of said rollers are clear of the turntable edges; a first rocker shaft; a first pair of cranks secured to said first rocker shaft; a pair of crank pins secured to said first cranks at first predetermined distances from said first rocker shaft and mounted to first ends of said frames; a second rocker shaft; a second pair of cranks secured to said second rocker shaft; a pair of camming members secured to said second cranks at second predetermined distances from said second rocker shaft longer than the first predetermined distances; a pair of cam-following blocks secured to the opposite ends of said frames and supported by said camming members; means for rotating said rocker shafts through predetermined angles so that said frames are elevated to lift the barrel off of the turntable and tilted to facilitate unloading of the barrel; switching means responsive to the mutual engagement of said locating pin and the orienting aperture for initiating the operation of said rocker-shaft rotating means; and timing means for operating said rocker-shaft rotating means in the opposite direction to return said rollers to their normal positions a predetermined time after elevation thereof and for re-engaging said turntable-rotating means a predetermined time after the return of said rollers to their normal positions.

References Cited in the file of this patent

UNITED STATES PATENTS

| | | |
|---|---|---|
| 2,341,128 | Titus | Feb. 8, 1944 |
| 2,780,340 | Hynson | Feb. 5, 1957 |
| 2,847,108 | Gross | Aug. 12, 1958 |